No. 684,221. Patented Oct. 8, 1901.
A. P. GILL.
COMBINED PLATE AND FILM CAMERA.
(Application filed Aug. 13, 1900.)

(No Model.)

Witnesses.  Inventor.
H. Dennison  A. P. Gill
L. Blackwell  by Fetherstonhaugh & Co
  Attys

UNITED STATES PATENT OFFICE.

ALBERT PAUL GILL, OF TORONTO, CANADA, ASSIGNOR TO CANADIAN CAMERA AND OPTICAL COMPANY, LIMITED, OF SAME PLACE.

COMBINED PLATE AND FILM CAMERA.

SPECIFICATION forming part of Letters Patent No. 684,221, dated October 8, 1901.

Application filed August 13, 1900. Serial No. 26,803. (No model.)

*To all whom it may concern:*

Be it known that I, ALBERT PAUL GILL, manufacturer, of the city of Toronto, in the county of York, in the Province of Ontario, Canada, have invented certain new and useful Improvements in a Combined Plate and Film Camera, of which the following is a specification.

My invention relates to improvements in combined plate and film cameras; and the object of the invention is to devise a simple and compact form of camera adaptable for the exposure of a film or plate, as may be desired; and it consists, essentially, of a case having end recesses to receive the film-rolls and spindles, and a central recess, preferably rectangular, designed to receive the lens and collapsible portion of the camera, such portion being contained entirely within the contour of the case and the parts being otherwise constructed and arranged in detail as hereinafter more particularly explained.

Figure 1:
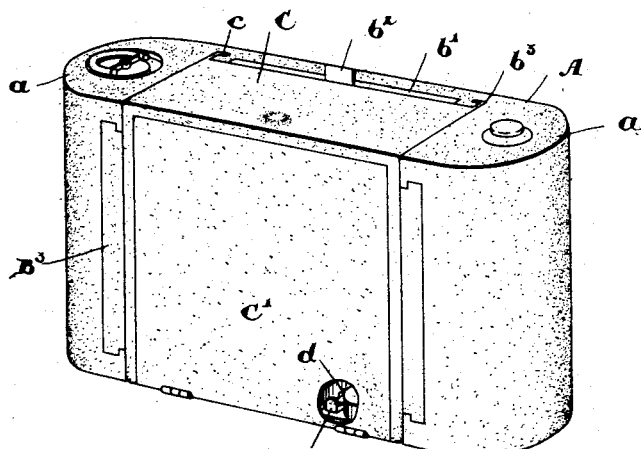
Figures 2, 3:
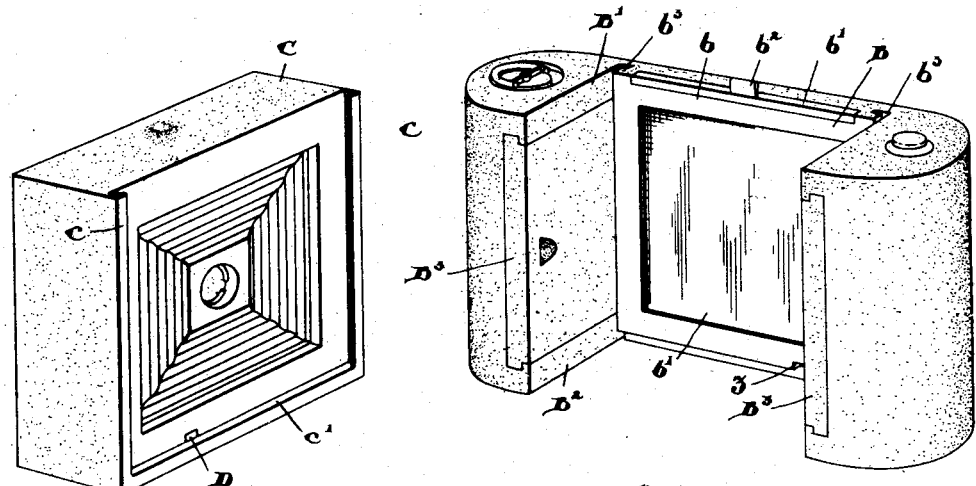
Figure 4:
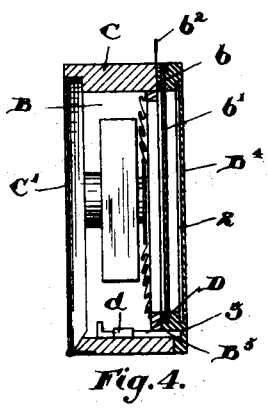

Figure 1 is a perspective view of my improved camera complete and closed. Fig. 2 is a detail showing the collapsible portion, including the lens and shutter, removed. Fig. 3 is a rear view of the removable central portion of the case containing the collapsible portion of the camera. Fig. 4 is a cross-section through Fig. 1 on a line with the broken-away portion shown in said figure.

In the drawings like characters of reference indicate corresponding parts in each figure.

A is the case, which is substantially rectangular in form and provided with semicylindrical ends $a$, within which are secured the film-rolls. Of course these ends may not be semicylindrical, but may be square or hexagonal or any other suitable form.

B is a rectangular recess formed in the central portion of the case, said recess being formed by the back frame $b$, having fitted in a suitable groove therein the slide $b'$, provided with a handle $b^2$. The sides of the back frame are formed with an L-shaped groove $b^3$ at each end. The sides of the recess are formed by the top and bottom side bars B′ and B², between which fit the slides B³, which close the chambers in which is contained the roll of film, the unexposed end of the roll being at one end and the exposed end being designed to be wound around on the opposite end by suitable means, which it is not necessary here to describe. It is sufficient to say that the film 2 passes between the back frame $b$ and the back of the camera B⁴, as indicated in Fig. 4.

C is the casing or portion containing the bellows or collapsible portion of the camera, such casing C being provided at the front with a hinged flap C′. The casing C is provided at the back at the two sides with L-shaped tongues $c$, such tongues being designed to receive a plate-holder when this portion of the camera is designed to be used separately with a plate-holder. Such tongues, however, are pushed up into the grooves $b^3$ when it is designed to use this portion of the camera together with the portion A and utilize the film instead of a plate.

When the tongues $c$ are pushed up into the corresponding grooves $b^3$, the bottom ledge $c'$ fits up against the bottom B⁵, and the top of the case, as well as the bottom, would be flush with the top and bottom of the casing A, being held in such position by the bolt D, which extends through the metal socket $d$ on the casing C into a receiving-socket 3 in the casing A beneath the back frame $b$.

From this description it will be seen that I provide a very simple and compact arrangement whereby the casing C may be used with plates separately or may be used together with the portion A when it is fitted in position in the recess B, in which latter case, of course, the slide $b'$ may be removed when it is desired to make an exposure. Of course it is necessary to have the slide in order that the portion or casing C may be utilized separately with a plate-holder.

What I claim as my invention is—

The combination with the main casing having a rectangular central recess and end chambers to contain the film-rolls and a suitable frame and slide at the back of such recess in front of the back proper, behind which the film passes, and L-shaped grooves in the back corners of the recess, of a supplemental casing carrying the focusing apparatus, the L-shaped tongues designed to fit in the L-shaped grooves in the back corners of the recess and means for holding the casing in position vertically when placed in the recess as and for the purpose specified.

ALBERT PAUL GILL.

Witnesses:
J. B. BOYD,
H. DENNISON.